United States Patent
Dotan et al.

(10) Patent No.: US 9,178,880 B1
(45) Date of Patent: Nov. 3, 2015

(54) GATEWAY MEDIATED MOBILE DEVICE AUTHENTICATION

(75) Inventors: Yedidya Dotan, Tel Aviv (IL); John G. Linn, Carlisle, MA (US); Christopher Corde, Brighton, MA (US); Philip A. Darringer, Seattle, WA (US); Robert S. Philpott, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/539,392

(22) Filed: Jun. 30, 2012

(51) Int. Cl.
*H04W 12/08* (2009.01)
*H04L 29/06* (2006.01)
*H04W 12/06* (2009.01)

(52) U.S. Cl.
CPC ........... *H04L 63/0876* (2013.01); *H04W 12/06* (2013.01); *H04W 12/08* (2013.01)

(58) Field of Classification Search
CPC ....... H04W 4/00; H04W 12/00; H04W 12/06; H04W 12/08; H04L 63/18; H04L 2209/80; H04L 63/083; H04L 63/0838; H04L 9/3226; H04L 9/3228; H04L 63/0876

USPC .......................................................... 726/18
See application file for complete search history.

(56) References Cited

U.S. PATENT DOCUMENTS

| | | | |
|---|---|---|---|
| 7,730,175 B1 * | 6/2010 | Roesch et al. ................ 709/224 |
| 2002/0034301 A1 * | 3/2002 | Andersson ................... 380/270 |
| 2003/0139910 A1 * | 7/2003 | Yamamoto et al. .......... 702/188 |
| 2008/0109365 A1 * | 5/2008 | Kulkarni et al. .............. 705/55 |
| 2008/0137861 A1 * | 6/2008 | Lindmo et al. ............... 380/270 |
| 2009/0249076 A1 * | 10/2009 | Reed et al. .................... 713/181 |

* cited by examiner

*Primary Examiner* — Jung Kim
*Assistant Examiner* — Ayoub Alata
(74) *Attorney, Agent, or Firm* — John T. Hurley; Jason A. Reyes; Krishnendu Gupta

(57) ABSTRACT

A method is used in authenticating a mobile device user. An authentication invocation from a mobile device for access to computer resource is activated. Device unique identifiers and device forensic information are collected. The device unique identifiers and the device unique identifiers are forwarded to a gateway. An OTP is resolved into a unique device identifier using an authentication server. The device identifier is adaptively authenticated using multiple authentication factors.

20 Claims, 2 Drawing Sheets

GATEWAY MEDIATED MOBILE DEVICE AUTHENTICATION

BACKGROUND

1. Technical Field

This application relates to gateway mediated mobile device authentication.

2. Description of Related Art

Computer networks, such as those provided at a workplace, university, or other organization, are often configured to allow users to gain network access remotely through virtual private networks (VPNs), customized network settings, and/or other technologies. To gain access, users are generally required to authenticate to the remote network. Authentication may involve users providing various authentication factors, such as passwords, token codes, and personal identification numbers (PINs). Remote networks generally include, or have access to, an authentication server. The authentication server receives authentication requests from users and either grants or denies access, based on whether authentication factors provided with the requests match expected values. For added security, networks often require that multiple authentication factors be entered and verified before access can be granted.

A common two-factor authentication scheme involves both a token code and a PIN. The token code, also known as a one-time password, or "OTP," is generated automatically, such as by a portable device that a user has in his or her possession. The PIN is a number, or possibly an alpha-numeric string, that the user has memorized. Both the token and the PIN have been registered previously in connection with the user at the authentication server. The user enters both the token code and the PIN in one or more fields of a network login screen on the user's computer. Access to the remote network is only granted to the user's device if both the token code (something the user has) and the PIN (something the user knows) can be verified. An example of a portable token is SecurID®, which is available from RSA Security Inc. of Bedford, Mass.

Recently, software has been introduced to perform the functions of tokens on mobile devices, such as smart phones, PDAs, and tablets. In one example, a user of a computer wishing to access a remote network enters his or her PIN into a field displayed on the user's mobile device. The mobile device sends the PIN to an authentication server. If the PIN matches an expected value, the authentication server sends back a signal to unlock the mobile device to allow the mobile device to display a token code. The user can then transfer the token code manually to the computer to enable the computer to gain access to the remote network.

SUMMARY OF THE INVENTION

A method is used in authenticating a mobile device user. An authentication invocation from a mobile device for access to computer resource is activated. Device unique identifiers and device forensic information are collected. The device unique identifiers and the device unique identifiers are forwarded to a gateway. An OTP is resolved into a unique device identifier using an authentication server. The user is adaptively authenticated.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

A conventional authentication system includes an authentication client which runs authenticator software (sometimes called a soft token) and an authentication server which work together to grant a holder of the authentication client with access to an electronic resource using one time use passwords (OTPs). Such OTPs are often referred to as OTP codes, token codes, one-time passcodes, and pseudo-random numbers, among other terms. To this end, both the soft token and the authentication server share a cryptographic key which is not otherwise known. The soft token uses the cryptographic key to produce a series of OTPs. Concurrently, the authentication server carries out the same operations on its end to produce the same series of OTPs. Accordingly, at any time, the holder of the soft token is capable of providing a matching OTP to the authentication server to prove that the holder possesses the soft token.

This conventional two part authentication process relies on two separate factors: something you know (e.g., a PIN) and something have (e.g., the SecurID token). With soft tokens, the token code is typically displayed on the mobile device and the user enters the OTP and their PIN to initiate authentication. Thus, although the OTP is visible on the device being authenticated, the OTP provides a useful security feature in that it can be used to confirm the device is not being impersonated.

One option may be to make a passcode, for example a SecurID® code (SID), invisible. In this way, the user does not have to enter SID as it can be sent automatically by the mobile device (MD). That is, a user would never see the SID code; it would be generated within the device and forwarded programmatically within it. The device is essentially used as a container for the SID code generation process. The user may still be required to provide information known to the user, such as a PIN or password to an application.

Since one of the typical two part security information factors is sent by the mobile device automatically, and, thus, no longer separate from the device, current techniques described herein may implement adaptive authentication to provide a way to realize two-factor authentication.

In an example embodiment, a method is used in authenticating a mobile device user. An authentication invocation may be activated from a mobile device for access to computer resources. Device unique identifiers and device forensic information may be collected. The device unique identifiers and the device forensic information may be forwarded to a gateway. An OTP may be resolved into a unique device identifier using an authentication server. The user is adaptively authenticated using multiple authentication factors, including a strong device identifier.

Figure 1:
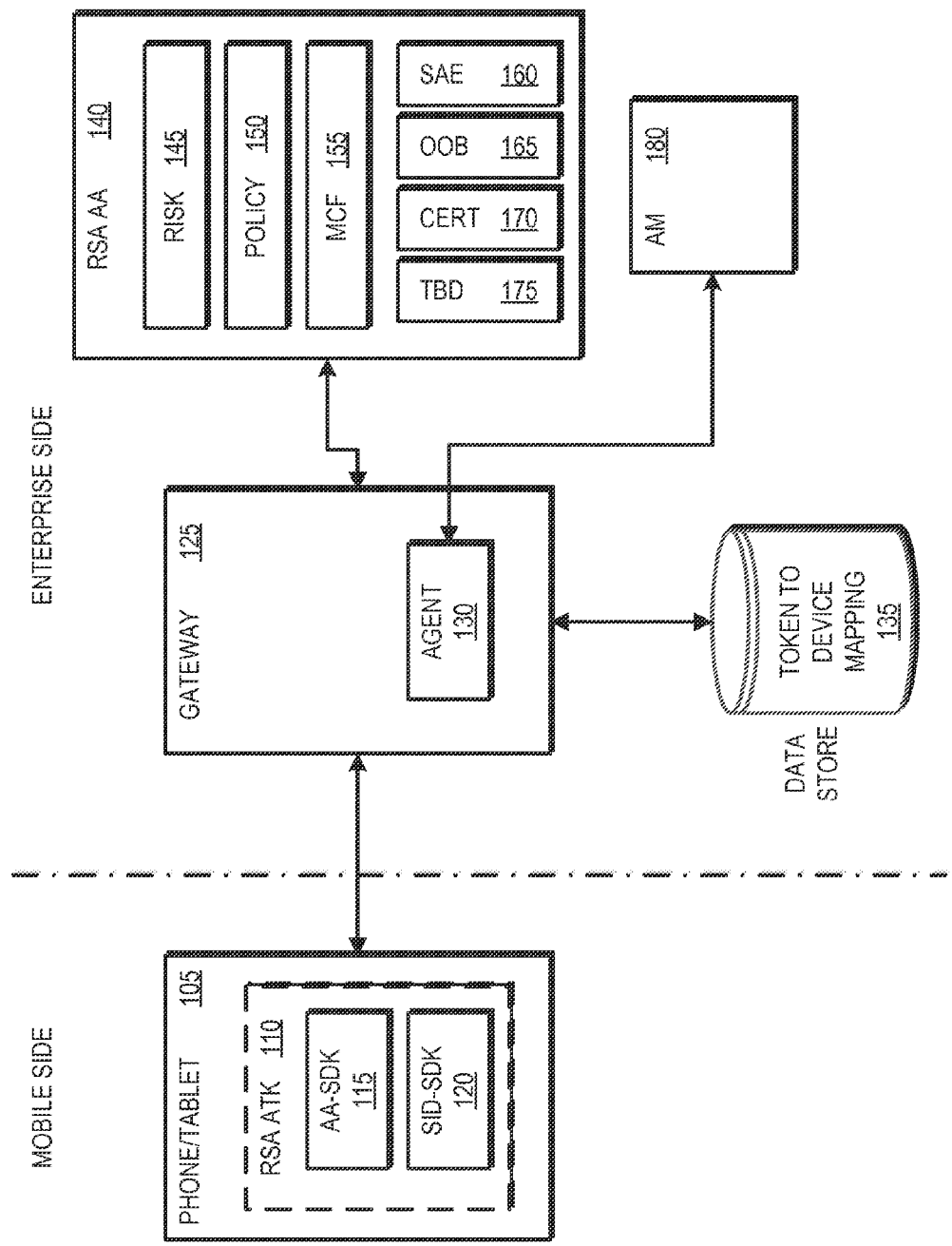
FIG. 1 is a block diagrams illustrating components that may be used in connection with techniques described herein.

Referring to FIG. 1, shown is an example embodiment utilizing techniques described herein. Components are shown as located on a mobile side or an enterprise side. On the mobile side, there is a mobile device 105 such as a mobile phone, tablet, tablet PC, iPAD or the like. Enterprise side components may include a gateway 125, adaptive authentication system (AA) 140 (e.g., RSA® AA), authentication server or manager (AM) 180 (e.g., RSA Authentication Manager), and a data store 135. The gateway 125 may be in communication with the AA 140. The gateway may further include an agent 130 in communication with the AM 180. The AA 140 may include a risk engine 145, policy manager 150, multi-credential framework (MFC) 155, authentication Engine (SAE) 160 (e.g., SecurID® authentication Engine), out-of-band authentication component (OOB) 165, certification manager (CERT) 170, and other various components (e.g., TBD 175).

In at least one embodiment of the current technique, a verifier may be used to help securely authenticate the identity of a user agent. As used here, "authenticate" means to verify the identity of a user or a user agent or a client device executing a user agent, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. A verifier can be any sort of device such as adaptive authentication system 140 that implements the techniques described herein. Authentication can result in the performance of one or more actions including, without limitation, providing access or privileges, taking action, or enabling some combination of the two. Access includes, without limitation: access to a physical location, communications network, or a computer system; access to such services as financial services and records, or health services and records; or access to levels of information or services. It may be important to determine whether a device that is requesting to access data of a web server by attempting to establish a session between the device and the web server by providing a bearer token is same as the device that has been authenticated by an identity provider and for which the bearer token has been created.

The adaptive authentication system 140 performs routine operations to determine whether to flag possible fraudster situations so that remedial steps can be taken. In this situation, the authentication system 140 compares user behavior data to recent user behavior data to generate a user behavior risk score which is evaluated against a predefined user behavior threshold (e.g., a tunable number between 0 and 1000). If the user behavior risk score is lower than the user behavior threshold, it may indicate that a possible fraudster situation is unlikely. However, if the user behavior risk score is higher than the user behavior threshold, it may indicate that a possible fraudster situation is likely. The adaptive authentication system 140 is constructed and arranged to perform authentication operations. In some arrangements, the authentication operations are exclusively risk-based.

It should be understood that an adaptive authentication engine 140 may be any one of the known device detection authentication system that manages association of client devices with a client and/or user and evaluates information gathered from a client device for validating the association of the client device with an authenticated client. It should be understood that the above-described adaptive authentication system 140 is capable of utilizing RSA Adaptive Authentication which is offered by RSA Security Inc. of Bedford, Mass. Certain aspects of RSA Adaptive Authentication relate to risk-based authentication (RBA) and fraud detection which involve measuring over one hundred risk indicators to identify high-risk and suspicious activities. Certain aspects of RSA Adaptive Authentication are powered by risk-based authentication technology that conducts a risk assessment of all users behind the scenes. A unique risk score is assigned to each activity, and users are only challenged when an activity is identified as high-risk and/or an organizational policy is violated. This transparent authentication enables organizations to increase security without compromising user convenience. Certain aspects of Adaptive Authentication monitor and authenticate activities based on risk, profiles, and policies by correlating: unique browser identification profiles, matching behavioral patterning profiles and inputs from fraud intelligence teams that locate compromised IP addresses and accounts.

Further, adaptive authentication system 140 is described in U.S. patent application Ser. No. 12/751,057 for "Techniques for Authenticating Users of Massive Multiplayer Online Role Playing Games Using Adaptive Authentication" filed Mar. 31, 2010, which is incorporated in entirety herein by reference. Further, risk score computation logic 26 of adaptive authentication system 140 is described in U.S. patent application Ser. No. 13/432,586 for "Performing Authentication Operations" filed Mar. 28, 2012, which is incorporated in entirety herein by reference. Further, risk score computation logic 26 of adaptive authentication system 140 is also described in U.S. patent application Ser. No. 13/336,570 for "Establishing A Trusted Session From A Non-Web Client Using Adaptive Authentication" filed Dec. 23, 2011, which is incorporated in entirety herein by reference.

The RSA authentication toolkit (ATK) 110 may be a wrapper located on the mobile device 105 and can be used to build other components, including an adaptive authentication (AA) software development kit (SDK) 115 and a secure ID (SID) software development kit 120. These components may be configured to generate device forensic information and/or collect device unique identifiers.

Device unique identifiers may include location, phone, device identifiers, velocity, transactional information, ISP address, or other similar user/behavior/environment data. Device forensic information may be information residing on a mobile device that is not a unique identifier but can be used to establish a device match at a point in time. Examples include: the versions of installed software; the number of contacts on your list; number of images; name of device; and so on. Adaptive authentication techniques may be utilized to collect over 30 such identifiers on mobile devices that create enough entropy to detect a device uniquely. For additional information regarding device forensic information and unique device identifier may be found in the above cited patent U.S. patent application Ser. No. 12/751,057 for "Techniques For Authenticating Users Of Massive Multiplayer Online Role Playing Games Using Adaptive Authentication."

In an example embodiment, the AA-SDK 115 may provide adaptive authentication related data including device unique identifiers that may relate to the 'adaptiveness' portion of authentication data. The SID-SDK 120 may provide a secure identifier (SID) that may include two factors such as a one-time password and user identifier. SID may also refer to device forensic information and/or device unique identifiers in various example embodiments. The RSA ATK 110 may be configured to generate the AA and SID payloads in a serial fashion, which may then communicate the determined payloads to the gateway 125. The AA and SID payloads may be communicated individually, or alternatively, they may be combined into an authentication object and communicated simultaneously.

The gateway 125 is at the center of the mediated mobile device authentication techniques described herein. Authentication data is received, modified, and communicated to and from the other system components, including the mobile device 105, RSA AA 140, AM 180, and the data store 135.

The gateway 125 may be configured to receive AA and SID payloads for further processing. For example, the agent 130 may forward the SID payload to the AM 130 to be validated. In response, the agent 130 receives validation confirmation or non-confirmation back from the AM 180 for further processing. The agent 130 may also communicate with a data store 135 to determine a device identifier. The gateway 125 may further communicate with the RSA AA 140 to forward the determined device identifier for use with adaptive authentication, for example.

The data store 135 may be any suitable data store capable of mapping a token iteration and a device identifier, such as a file system, object store, relational database management system (RDBMS), and the like. The user identifier is mapped to convert the user identifier to a device identifier which is then returned to the gateway 125. A component of the SID payload (e.g., user identifier) is received from the gateway 125 at the data store 135. The data store 135 may employ mapping techniques to convert authentication information, such as a user identifier to, for example, a device identifier.

The RSA AA 140 is configured to perform adaptive authentication using the device ID received from the gateway 125 by employing known adaptive authentication methods. Various RSA AA 140 components 145-175 may be used to implement such methods. In particular, the risk engine 145 is constructed and arranged to perform adaptive authentication operations on adaptive authentication factors from a mobile device 105 in order to generate risk scores. For example, from the adaptive authentication factors, the risk engine 145 is able to assess whether the user is authentic (or an imposter) by comparing information such as current device location, transactional information, or other similar user, behavior, or environment data to previously stored data. A risk score resulting from each adaptive authentication operation is a numerical value which quantitatively identifies a level of risk, and which can be compared to a tunable threshold to determine whether that adaptive authentication operation is successful or unsuccessful. In at least some embodiments, the risk score computation logic 26 includes fuzzy logic circuitry which applies fuzzy logic analysis when evaluating adaptive authentication factors collected from the mobile device 105. Additional information regarding components 145-175 may be found in the aforementioned patent applications incorporated by reference.

The AM 180 is a software component used to verify authentication requests and administer user authentication policies for access to enterprise side networks to provide two-factor user authentication. In an example embodiment, the AM 180 may receive a SID in order to perform a first step in the gateway mediated authentication process. The AM 180 performs an authentication operation, applying the SID's user identifier and token code. The AM 180 may, at this point, grant or deny the authentication request by forwarding such status back to the gateway agent 130.

Alternative example embodiments may include various features such as converting a user identifier to a device identifier wherein the device identifier is stored in a data store. Converting a user identifier to a device identifier may include converting the user identifier to a general user identifier (GUID) for use as the device identifier in some implementations. The OTP may be a SID. A resolution of the OTP may be associated to the device identifier. Collecting device unique identifiers may further include generating a soft token and combining the soft token with a PIN to form a passcode. The soft token may include a token code that is invisible to a user of the mobile device. The token code may be automatically forwarded to the gateway. In various example embodiments, the data store is a file system, object store, or RDBMS. Forwarding the device forensic and unique identifiers may further include combining the device forensic and unique identifiers to form an authentication object and forwarding the authentication object to a gateway.

Figure 2:
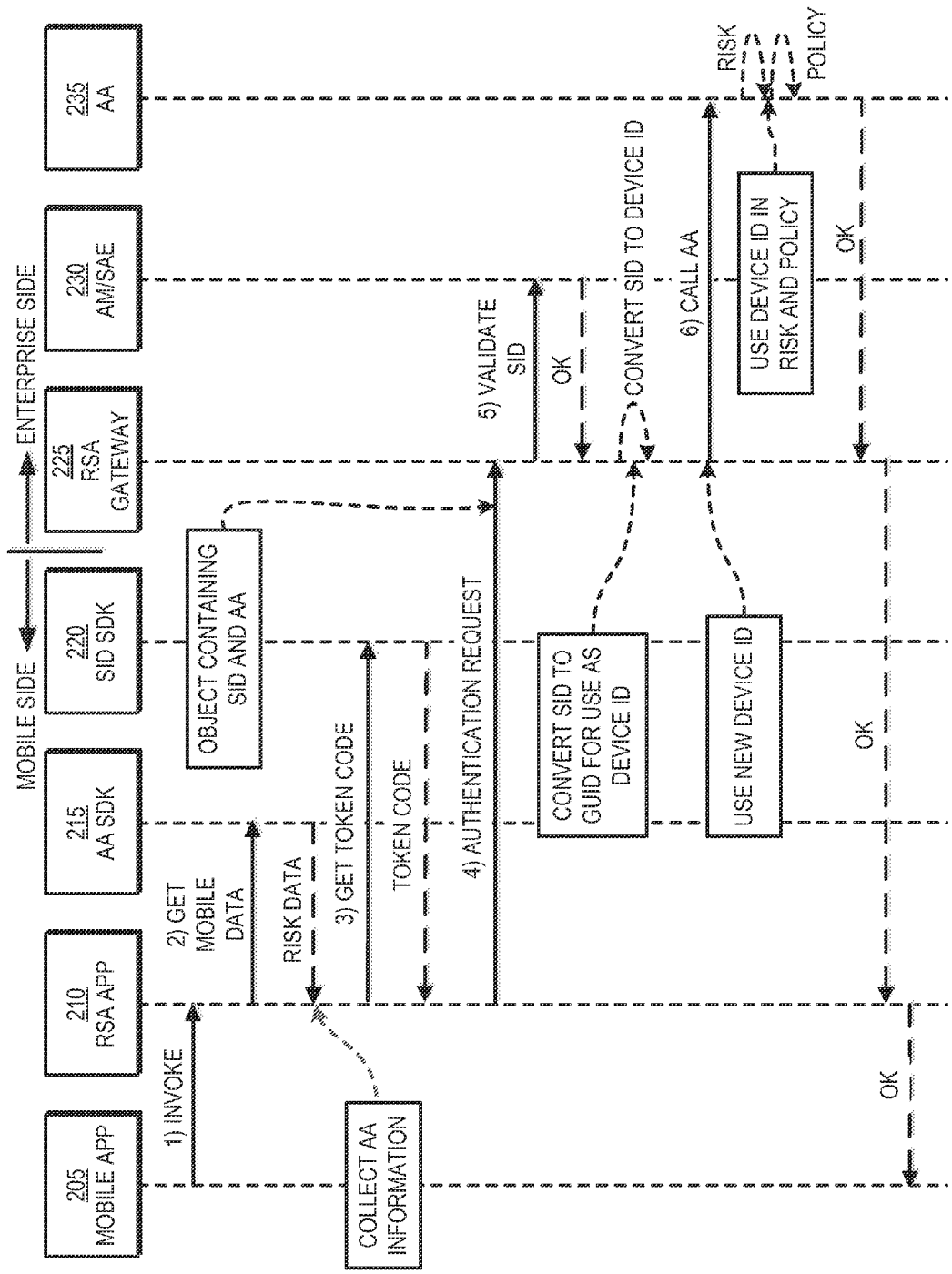
FIG. 2 is a flow diagram illustrating an example process that may be used in connection with techniques described herein.

Referring to FIG. 2, shown is a flow diagram illustrating an example method for use in authenticating a mobile device using a mediated gateway. While various methods disclosed herein are shown in relation to a flow diagram, it should be noted that any ordering of method steps implied by such flow diagram or the description thereof is not to be construed as limiting the method to performing the steps, or sub-steps within or among the steps, in that order. Accordingly, embodiments may be constructed in which acts are performed in orders different from those illustrated, which may include performing some acts simultaneously, even though the acts are shown as sequential in the illustrated embodiments. Also, it is understood that these processes are presented merely as examples and are not intended as an exhaustive or limiting set of options. Further, the illustrated flow diagram is merely one or more example embodiments, various other methods that include additional steps or include fewer steps than illustrated are also within the scope of the present invention.

The main components interacting in the flow diagram represented in FIG. 2 have similar general logical functions as like named components described above with reference to FIG. 1. As shown, the authentication method can begin with step 1 via an invocation activated by the mobile application 205. The method can be initiated manually by a user, for example, by entering a command in a command-line-interface or by clicking on a button or other object in a graphical user interface (GUI).

Flow components includes a mobile device application 205 (e.g., a banking app), RSA application 210 (e.g., RSA ATK), AA SDK 215, SID SDK 220, residing on the mobile side, and an RSA gateway 225, AM/SAE 230, and AA 235 on the enterprise side. In operation, at step 1, the mobile application 205 will invoke the RSA APP 210 to request authentication be performed. At step 2, mobile data may be collected (e.g., adaptive authentication related information) from the AA SDK 215. At step 3, SID information (e.g., an OTP and user identifier) may be collected from the SID SDK 220.

At step 4, an authentication request may be forwarded to the RSA gateway 225 which resides on the enterprise side. The request includes a consolidated object comprising the mobile data (AA data) payload and the SID payload (OTP and user identifier) retrieved during steps 2 and 3. At step 5, the RSA gateway 225 forwards the SID to the AM 230 where a resolve or validate operation is performed by applying the SID's user identifier and OTP. The user identifier may include a device identifier, user identifier, or device identifier and user identifier combination. The validation request is granted or denied and a representative status indicator is returned to the RSA gateway 225. If the validation request is granted, the SID information is forwarded to a data store where it may be mapped against a device identifier. That is, the SID may be converted to a globally unique identifier (GUID) for use as a device identifier using additional information in the payload. This may be the token record that gets registered. It should be noted that because dynamic mapping is used, if device information is compromised, the device ID can be reset. In addition, the SID code on the mobile device can also be reseeded. The mapping is not changed avoiding the need for AA to relearn the device. Thus, there is a form of independence between the two.

At step 6, a call to the adaptive authentication system 235 is issued where a risk assessment is executed and a policy is invoked. Here, the derived device ID may be used during the risk assessment and policy invocation to achieve a better indication of the device being authenticated. Information in the AA system 235 may also be indexed in the situation where a user uses a variety of devices. If authentication is confirmed, a representative indicator is communicated to the RSA gateway 225. The RSA gateway 225 may then notify the RSA application 210 that authentication was performed successfully, and the RSA application 210 in turn notifies the mobile application 205 that authentication was successful. At this point, the mobile device may now begin accessing enterprise side computer resources (e.g., using a banking application) via the mobile device.

Thus, utilizing gateway mediated mobile authentication techniques described herein provide an additional layer of security for mobile devices that use soft tokens. For example, if an unauthorized user obtains the mobile device and PIN and attempts to execute unauthorized transactions, or is in a new location, or other suspicious activity occurs that may invoke the risk assessment or policy, authentication may be denied, for example, at step 5 . . . . Consequently, even though the device may accurately be identified as the correct device, the other collected information may prevent authentication. Thus, conventional systems may allow authentication should an unauthorized user obtain the mobile device and PIN. By contrast, the current techniques may prevent authentication in such a situation.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in authenticating a mobile device user, the method comprising:
    activating an authentication invocation from a mobile device for access to computer resource;
    collecting, at the mobile device, device unique identifiers, device forensic information, and a user identifier, wherein the device forensic information includes information residing on the mobile device that is not a unique identifier;
    generating, at the mobile device, a one-time password (OTP);
    forwarding an authorization request to a mediated gateway, the authorization request including the collected information and the OPT;
    validating, at the computer resource, the one-time password (OTP);
    converting the OTP and user identifier into a globally unique device identifier using an authentication server; and
    adaptively authenticating the user using the globally unique device identifier and the collected information.

2. The method of claim 1, wherein converting further includes converting a user identifier to a device identifier wherein the device identifier is stored in a data store.

3. The method of claim 1, wherein adaptively authenticating the user includes executing a risk assessment using the globally unique device identifier.

4. The method of claim 1, wherein adaptively authenticating the user includes invoking a policy using the globally unique device identifier.

5. The method of claim 1, further including associating a resolution of the OTP to the device identifier.

6. The method of claim 1, wherein generating the OPT includes using a soft token OTP generator and combining the OTP with a PIN to form a passcode.

7. The method of claim 6, wherein the OTP includes a token code that is not visible to a user of the mobile device.

8. The method of claim 7, wherein the token code is automatically forwarded to the gateway.

9. The method of claim 1, wherein the data store is a file system, object store, or relational database management system (RDBMS).

10. The method of claim 1, wherein forwarding the adaptive authentication information further includes combining adaptive authentication information and the secure identifier to form an authentication object and forwarding the authentication object to a gateway.

11. A system for use in authenticating a mobile device user, the system comprising:
    first hardware logic configured to activate an authentication invocation from a mobile device for access to computer resource;
    second hardware logic configured to collect, at the mobile device, device unique identifiers, device forensic information, and a user identifier, wherein the device forensic information includes information residing on the mobile device that is not a unique identifier;
    generate, via the second hardware logic, a one-time password (OTP);
    third hardware logic configured to forward an authorization request to a mediated gateway, the authorization request including the collected information and the OPT;
    forth hardware logic configured to validate, at the computer resource, the OTP;
    convert, via the forth hardware logic, the OPT and user identifier into a globally unique device identifier using an authentication server; and
    fifth hardware logic configured to adaptively authenticate the user using the globally unique device identifier and the collected information.

12. The system of claim 11, wherein the forth hardware logic is further configured to convert a user identifier to a device identifier wherein the device identifier is stored in a data store.

13. The system of claim 12, wherein the forth hardware logic is further configured to adaptively authenticate the user includes executing a risk assessment using the globally unique device identifier.

14. The system of claim 11, wherein adaptively authenticating the user includes invoking a policy using the globally unique device identifier.

15. The system of claim 11, further including associating a resolution of the OTP to the device identifier.

16. The system of claim 11, wherein the second hardware logic is further configured to generate an OPT using a soft token OTP generator and combining the OTP with a PIN to form a passcode.

17. The system of claim 16, wherein the OTP includes a token code that is not visible to a user of the mobile device.

18. The system of claim 17, wherein the token code is automatically forwarded to the gateway.

19. The system of claim 11, wherein the data store is a file system, object store, or RDBMS.

20. The system of claim 11, wherein third hardware logic is further configured to combine adaptive authentication information and the secure identifier to form an authentication object and forward the authentication object to a gateway.

* * * * *